Figure 1:
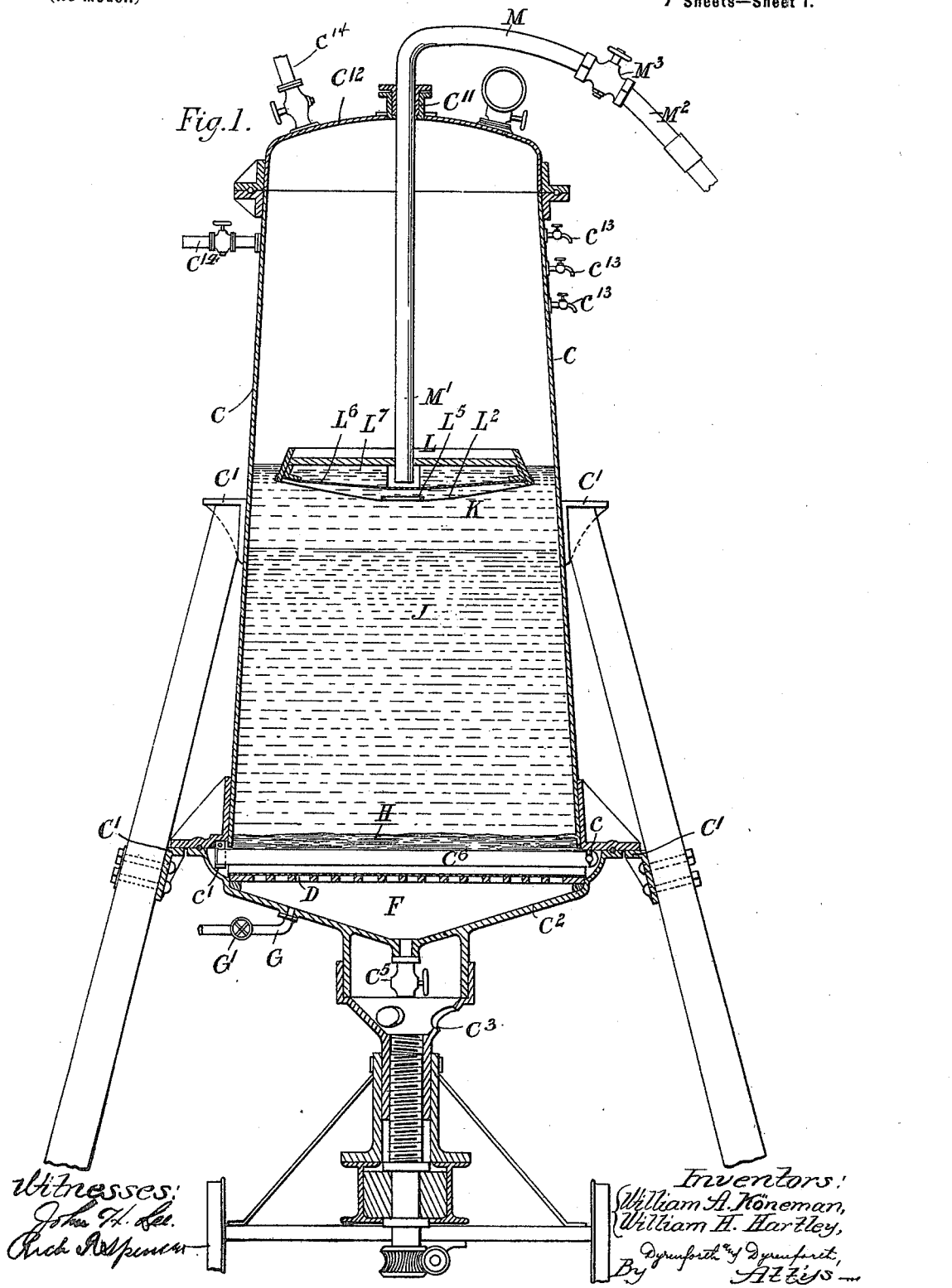

No. 617,029. Patented Jan. 3, 1899.
W. A. KÖNEMAN & W. H. HARTLEY.
APPARATUS FOR SEPARATING LIQUIDS FROM SOLIDS.
(Application filed Oct. 28, 1897.)
(No Model.) 7 Sheets—Sheet 2.

No. 617,029. Patented Jan. 3, 1899.
W. A. KÖNEMAN & W. H. HARTLEY.
APPARATUS FOR SEPARATING LIQUIDS FROM SOLIDS.
(Application filed Oct. 23, 1897.)
(No Model.) 7 Sheets—Sheet 3.
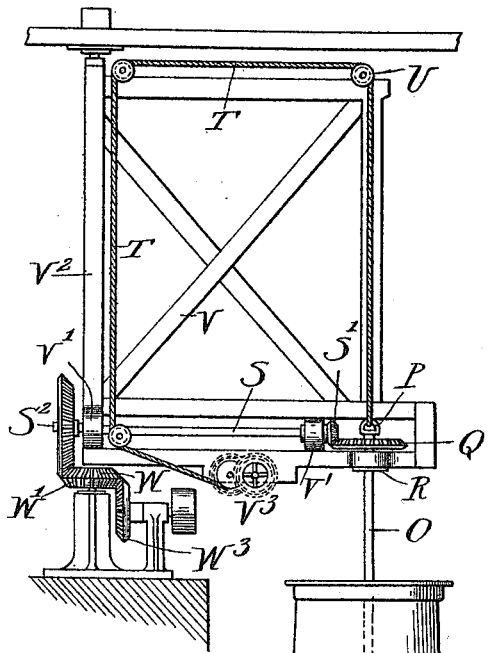
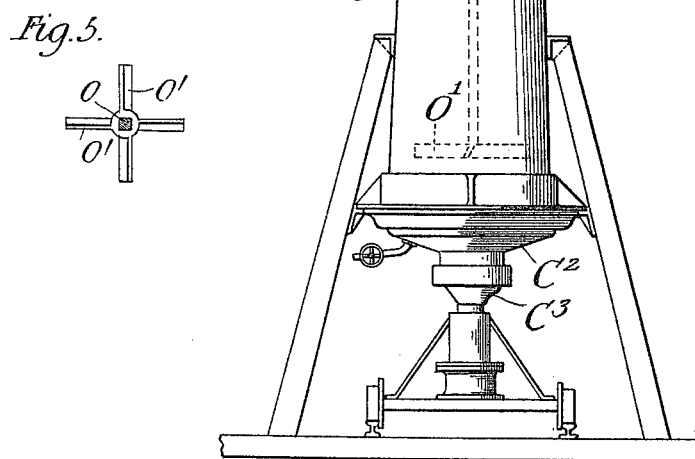

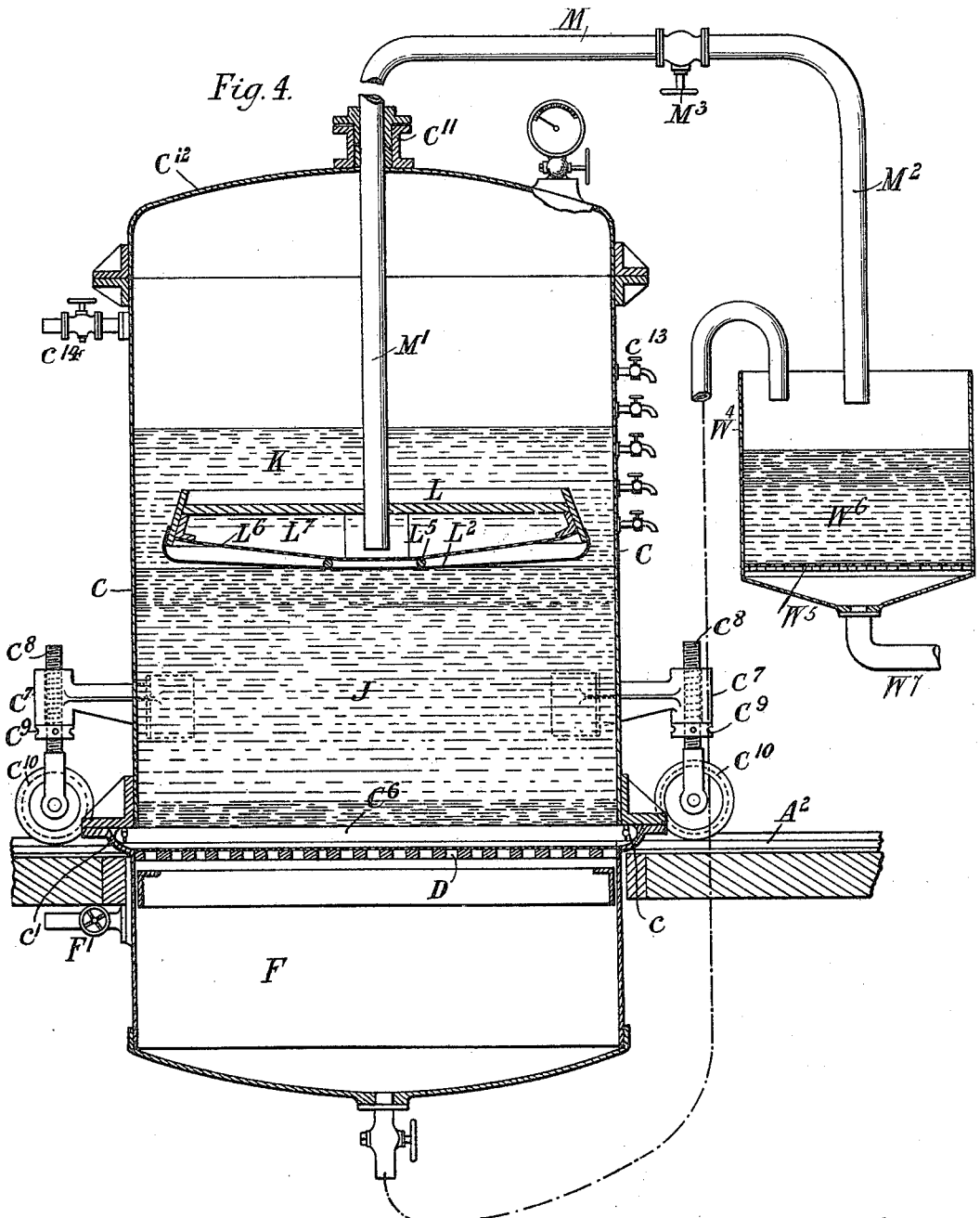

No. 617,029. Patented Jan. 3, 1899.
W. A. KÖNEMAN & W. H. HARTLEY.
APPARATUS FOR SEPARATING LIQUIDS FROM SOLIDS.
(Application filed Oct. 23, 1897.)
(No Model.) 7 Sheets—Sheet 5.

No. 617,029. Patented Jan. 3, 1899.
W. A. KÖNEMAN & W. H. HARTLEY.
APPARATUS FOR SEPARATING LIQUIDS FROM SOLIDS.
(Application filed Oct. 23, 1897.)

(No Model.) 7 Sheets—Sheet 6.

No. 617,029. Patented Jan. 3, 1899.
W. A. KÖNEMAN & W. H. HARTLEY.
APPARATUS FOR SEPARATING LIQUIDS FROM SOLIDS.
(Application filed Oct. 23, 1897.)
(No Model.) 7 Sheets—Sheet 7.

UNITED STATES PATENT OFFICE.

WILLIAM A. KÖNEMAN AND WILLIAM H. HARTLEY, OF LONDON, ENGLAND.

APPARATUS FOR SEPARATING LIQUIDS FROM SOLIDS.

SPECIFICATION forming part of Letters Patent No. 617,029, dated January 3, 1899.

Application filed October 23, 1897. Serial No. 656,203. (No model.)

*To all whom it may concern:*

Be it known that we, WILLIAM ADOLPH KÖNEMAN, a citizen of the United States of America, and WILLIAM HENRY HARTLEY, a subject of the Queen of England, residing at London, England, have invented certain new and useful Improvements in or Relating to the Separation of Liquids from Bodies Containing or Mingled with the Same, of which the following is a specification.

The object of this invention is to provide effectual means and apparatus for the removal of liquid from a mixture of such liquid and slime-bearing material, such as finely-pulverized ores, ore-slimes, sewage, and the like. For the purpose of illustration we will describe the operation of the treatment of slime-containing ores, as similar procedure takes place in all cases.

We desire it to be understood at the outset that we are aware of the present state of the art and that portions or partial steps of our procedure have been in use and likewise that apparatus has been constructed in which our procedure could be carried out in part only; but none of such methods or apparatus have or can accomplish the results we attain by the combination and use of the forces and means which we have discovered to be essential to success. Thus slimy ores have been subjected to pressure in receptacles having a filter-bottom for the purpose of pressing or forcing the liquid through the filter-bottom; but this can only be accomplished through a very thin layer of slime, and in no instance has slimy ore been subjected to such pressure treatment in a large or thick mass of several feet in thickness for the purpose of separating the larger quantity of the liquid out on the top of the slimes, compacting the slimes, and separating and removing the collected liquid from the top through a float by the internal pressure. It is also common practice to employ a partial vacuum below the filter-bottom of leaching-tanks to facilitate filtration through the filter-bottom. Likewise it is common practice to settle by gravity, but not to compact, slimes in open tank-like receptacles and to withdraw the superincumbent liquid from the top by siphon or other means. This procedure is unsatisfactory, because the liquid containing valuable dissolved metals cannot be freed sufficiently from the ore, and great loss is the result. Revolving cylinders or barrels in which pressure is maintained and in which the liquid is forced through a filter located on the periphery while the barrel is at rest and the filter is at the bottom are also in use; but all of the filtering or so-called "leaching" devices act through the bottom filter, while all so-called "decantation" devices are open receptacles and act without pressure; but the most conclusive proof of the failure of all the aforementioned devices to accomplish satisfactory results may be found in the fact that whenever ores containing clay or talc slimes are to be handled the very expensive, slow, and complicated system of filter-press manipulation is resorted to and generally discarded on account of its great objections and cost unless the slimes are very rich, yet this system of treatment is the only one of all systems now in vogue by which the clay or talc slime can be handled at all, and even in this case it is necessary to mix such slimes with granular material or failure is sure to follow. We desire to disclaim distinctly any and all such devices and methods, and wish to draw particular attention to the fact that it is now the universal practice to separate the slimes from the granular portion of the ore either by dry screening or by tank-washing or by the spitzluten, which involves the use of an apparatus in which the material is graded and the slime is caused to wash out over the top. The reason for this is to enable proper leaching and consequently high metal extraction from the coarser ore, because the slimes cannot be treated to anything like the degree of perfection on account of the inability to remove the solution properly by the present systems and on account of the inability to properly compact them. Hence it is now the further practice at all works where ore is treated by cyanid or other wet-process solutions to crush the ore as coarse as commercial results will allow, in order to produce as little slime as possible, although finer pulverization will yield higher results. The great difference between the general practice and our system lies in the broadly-stated facts that all present systems must and do separate the slime from the granular portion of the ore, as they cannot treat it in bulk except by the imperfect system of gravity settling and decantation, whereas we invite the very condition which defeats the present practice—namely, the presence of slimes and maximum density of the charge.

Having set forth this preliminary disclaimer and explanation, we will describe our invention and the results as obtained by actual practice with an apparatus in which we are treating three-ton charges of slime-bearing ores containing forty-five per cent. of slimes, of which slimes sixty per cent. is red clay and the whole is mixed with sixty per cent. its weight of liquid, we have likewise operated on various industrial products.

The principles discovered are, first, if a slimy-ore charge mixed with liquid is subjected to pressure in a receptacle having an open-discharge filter-bottom there is at first a free discharge through the filter-bottom, but this discharge diminishes in the ratio of the compacting of the ore charge and practically ceases on complete compacting, while the liquid separates out and collects on the top. The clarification of the liquid left on the charge while under pressure and without lime or other additions for clarification when equal weight of liquid and ore slimes are used takes place in from six to nine hours; second, the complete compacting of the charge and the separating of the liquid on top of the charge are dependent as to time on the quantity of liquid which can be and is abstracted through the bottom filter during the operation and on the rapidity of its abstraction; third, a vacuum acting below the filter on the bottom of a charge simultaneously with pressure on top of the charge will withdraw over double the liquid through the bottom filter which the same pressure plus the vacuum force when the total is applied on top of the charge will abstract, and the compacting of the charge and separation of the liquid on top of the charge takes place in correspondingly-reduced time; fourth, that the discharge of the liquid which separates out on top of the charge can take place immediately after the compacting of the charge by combining with the pressure apparatus a suitable auxiliary filter for exterior clarification; fifth, that a surface filter may be employed for the removal of liquid from the top of the charge even before complete compacting of the charge has taken place and that such filter will free itself when it has become clogged by a slime coating when pressure is let off; sixth, that such clogging of a surface filter is largely prevented by providing it with a loosely-hung or slack and well-weighted filter-cloth; seventh, that rotatory agitation of the charge while filling the apparatus causes a graduated arrangement as to coarseness and specific gravity of the materials composing the charge and the perfect separating of the slimes on top of the charge and the collecting of metallic matter or concentrates on the very bottom of the charge; eighth, that the slimes superincumbent on the charge when so arranged by agitation cracks open and the slime on top becomes permeated with seams while under pressure as soon as the liquid is removed from the top thereof, which consequently enables the removal of moisture from the charge to any desired extent by drying the charge with compressed air passing through the openings and crevices so created, (the crevices being formed, the air passing through them forces from the body that portion of the solution which is richest in gold and which heretofore has always been lost;) ninth, that an ore charge so treated may be readily carried and supported after the removal of the filter-bottom by a few movable supporting-bars at the bottom of the charge, and by arranging the height or position of these bars the concentrates can be collected below the bars and removed with the filter-bottom and the ore tailings can be dropped at will into suitable conveyances for removal, thus avoiding all shoveling. These are the principal features on which our invention rests and all of which features and observations we claim are new, have never been made by others, and are nowhere in use.

It will be readily understood that the apparatus we employ is constructed for the purpose of separating and removing water or solution containing the dissolved metals from ores, and as such dissolving of the metals to be extracted takes a considerable period of time we advise that such procedure should take place in auxiliary receptacles, and the use in connection therewith of our slack and weighted surface-filter actuated by a vacuum applied to its casing, as alkaline wash or other water, may thus be readily removed therefrom by this surface filter before the solvent solution is added. When the surface filter is thus used and operated by a vacuum, the vacuum pipe or hose is provided with a two-way cock or valves as shown in drawing Figure 1 at $M^3$, establishes the vacuum connection, or when turned to open a passage to the atmosphere allows air to enter the surface-filter casing, but does not break the vacuum in the receiver or vacuum-chamber, with which the filter suction-pipe is connected. This proviso allows the slack filtering fabric, when choked, to drop and free itself of slime accumulations when air is admitted to the filter case or housing.

The time required to fill, agitate, compact remove solution and wash-water, dry the charge, remove the charge and concentrates, and replace the bottom ready to recharge is from two to three hours, depending on the nature of the ore, size of charge, and volume of air used for drying. A charge three feet in thickness of the composition as given compacts and is freed from free liquid in forty-five minutes and is completely treated in two hours. Thus an apparatus eight feet in diameter will treat a charge three feet thick in the compacted form, or eight tons of two thousand pounds each in two hours completely, which time would be slightly increased for a charge four feet in thickness, &c. This result is attained in a properly-agitated charge when pressure is used on top of the charge and a vacuum below the filter, the pressure being forty-five pounds' gage pressure and the vacuum fifteen inches mercurial gage. The same charge requires over double the time if the vacuum is dispensed with and is not hastened materially when sixty pounds' pressure is used without the vacuum, thus disproving the universal belief that a vacuum force of, say, seven and a half pounds below the charge and pressure on top of the charge of forty-five pounds would give the same results as in such an operation would be obtained by a pressure on top only of fifty-two and a half pounds, which belief is undoubtedly the reason why pressure and vacuum combined have not heretofore been used. We therefore use the combined forces for the sake of acceleration when handling material of great impermeability. The simultaneous use of pressure above and vacuum below the charge also enables us to use the apparatus with quick and commercial results on many slime-bearing ores or mixtures by abstracting the liquid therefrom through the filter-bottom only, while the same mixtures cannot be so manipulated either by the use of pressure or vacuum alone; but such action generally depends on the character of the top slime and in its thickness. A layer of six inches compacted clay on top of other slimes and ore interferes with the use of this system; but extremely fine ground quartz or other hard-rock slimes offer but little resistance to this combined force against downward filtration. We therefore regulate the use of the surface filter largely by the nature and character of the slime composition.

To make the pressure-separator a commercial factor, the essential features are, first, cheapness of construction; second, ease of removing the filter-bottom; third, ease of removing the top and the surface filter; fourth, cheap discharging faculties.

Regarding construction it will be observed, more particularly after consideration of the drawings, hereinafter referred to, that one filter-bottom carriage can be made to serve a number of tanks, and we prefer the carriage for removal for this reason and because by its use the filter-bottom may be raised and lowered very quickly by means of compressed air actuating a piston in the carriage, as hereinafter described. The top is preferably similarly removed on adjustable carrier-wheels, and the top is made sufficiently high to accommodate the surface filter within its housing. By passing the stem of the filter through a stuffing-box in the cover a true position of the surface filter is maintained, which is very essential, as the slightest unbalanced condition when it is attached to a discharge-hose on the side causes it to tilt, when it blows air and becomes inoperative, a condition which is thoroughly avoided by the centrally-guided and rigid tubular discharge-stem.

We desire it understood that various structural details may be changed to accomplish the various results obtained, and the particular constructive details shown in the drawings are merely such as we have found to answer our purpose. Thus, for instance, in place of a movable carriage to remove the filter-bottom a system of raising and lowering by carrier-wheels similar to the device shown for the removal of the cover might be used, the surface filter might be attached to a hose fastened to the side, &c., all of which changes would be only structural, but would not affect the principles involved, and we therefore desire it understood that we do not limit ourselves to the structural details as shown. Thus, likewise, is the height of the apparatus dependent on the amount of liquid contained in the charge, so that, for example, a cylinder eight feet in diameter and twelve feet high is sufficient for a ten-ton ore charge when equal weights of ore and liquid are treated, whereas the same ten tons of ore when mixed with two and a half times its weight of water would require the apparatus to be twenty feet high; but whenever a slime-bearing liquid is treated in which the percentage of slime is but slight, as is frequently the case with separated ore-slimes and with sewage, it may be successfully treated and the passage to and shoveling from settling-pits avoided by applying the vacuum below the filter-bottom and while keeping the receptacle closed on top compressing the contained air therein by pumping the slime-bearing liquid into the apparatus under liquid-pressure as long as percolation through the filter-bottom can be maintained, which will be the case until compacted slime of considerable thickness had accumulated in the filter-bottom. When this stage of compacting and impermeability is reached, any liquid on top of the slimes can be removed by regular procedures.

In certain cases also the apparatus may be used by leaving out the surface filter and substituting other means, such as a float, for the removal of the liquid from the top of the ore. We have mentioned that clarification of this liquid takes place in from six to nine hours. This time is largely dependent on the nature of the slimes and whether lime or other clarifying matter is added to facilitate the settling and clarification, so that if the charge can be allowed to stand for a sufficient period after it has been compacted by pressure, when only small amounts of ore are available or when the pressure-separating department is largely in excess of the crushing capacity the liquid can be withdrawn clarified from the pressure-compacted charge, and thus save not only the operation of the surface filter, but likewise auxiliary filtration, or if it is desired to recover water from the ore for immediate reuse in the battery the liquid may be withdrawn in a turbid condition as soon as compacting is finished by use of an open pipe-discharge, or it may be withdrawn even during the compacting stage by means of the surface filter; but the compacting of the charge is in all cases the fundamental feature necessary to be thoroughly accomplished, as without such compacting no clear line of separation of the liquid from the ore-slimes can be produced, the top slimes remaining in a more or less sludgy condition, which is the case in the present open-tank system of slime treatment even after twenty-four hours' settling, and in the case of clay or talcose slimes a satisfactory condition for successful working cannot be attained at all by the present practice, the slimes remaining sludgy and semiliquid even after standing a week, and the only way they are now treated, as mentioned, is by filter-presses at an expense for power and attendance so great as to make the procedure unprofitable, except in the case of very rich ores. Fig. 3 shows the stirrer or agitator we employ and which is so arranged that a single agitator is made to rotate upon a step-bearing, so that it may serve a number of pressure-separators or solution-tanks. In the case of ore treatment where both granular and slimy material is present such agitation is very essential to secure proper classification of the material and correspondingly rapid compacting, and it assures the cracking of the charge in proper manner for the final drying stage of the operation. This cracking of the charge in case of a solid slime charge or in case of an insufficiently-graduated charge is otherwise accomplished by withdrawing pressure from the top of the charge and causing air or water to be forced through the bottom of the charge. The perfect graduating of the charge is absolutely necessary when the ore under treatment contains valuable compounds which form concentrates or coarse gold which has not been dissolved by the solvent. In this case gentle rotatory agitation causes all material of sufficient specific gravity to settle and collect together on the bottom of the charge, and these concentrates are deposited on the filter-bottom and are removed therefrom before the charge is dropped. In this case the charge-supporting bars are set sufficiently high above the filter-bottom to leave a space between the bottom of the bars and the filter-bottom sufficiently great to accommodate the amount of concentrates approximately known to be present in the charge. Thus by the use of our system of treatment slime-pits, settling-pits, and slime separators and concentrators may all be dispensed with, and a great saving is therefore effected, besides the great advantages gained in the perfect recovery of the water where it is scarce and the much higher extraction, as well as the extraction of all the gold in one operation from both granular ore and slimes; also, the saving of chemicals, both on account of the greater and more perfect abstraction of the solution from the ore, but also on account of the less dilution of the solids. Aside from these advantages there is a great saving in labor, especially on account of the final tailing discharge. The cost of installation is also much less, and the plant put down is cheaply and readily moved when change of position becomes advisable.

Figure 2:
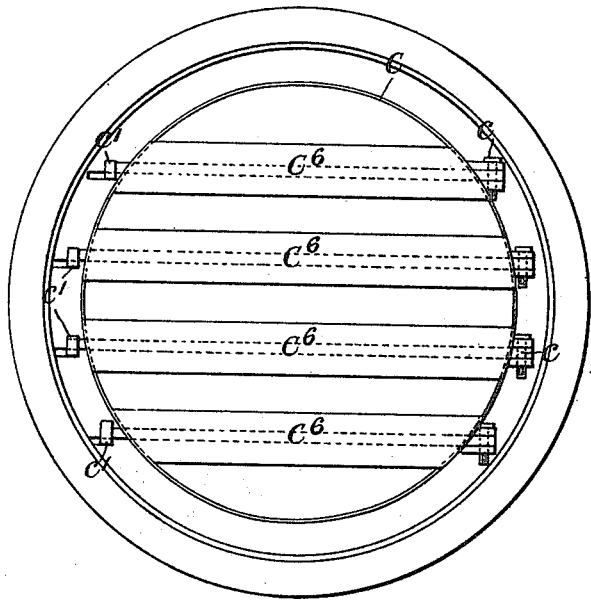
Figure 6:
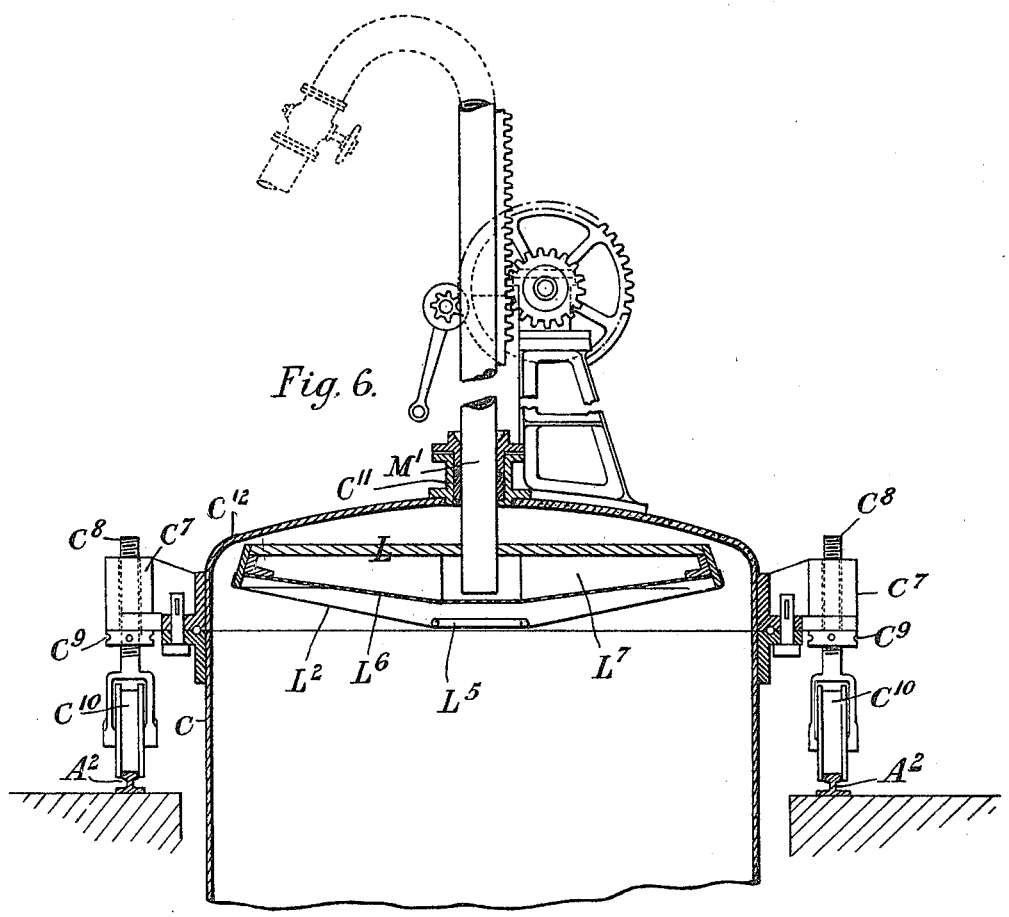
Figure 7:
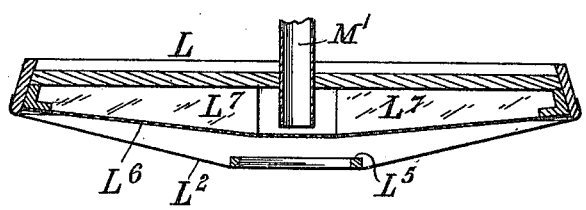
Figure 8:
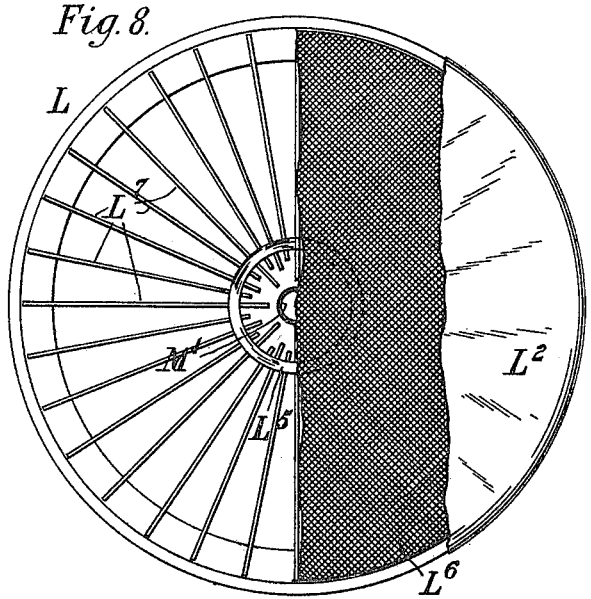
Figure 9:
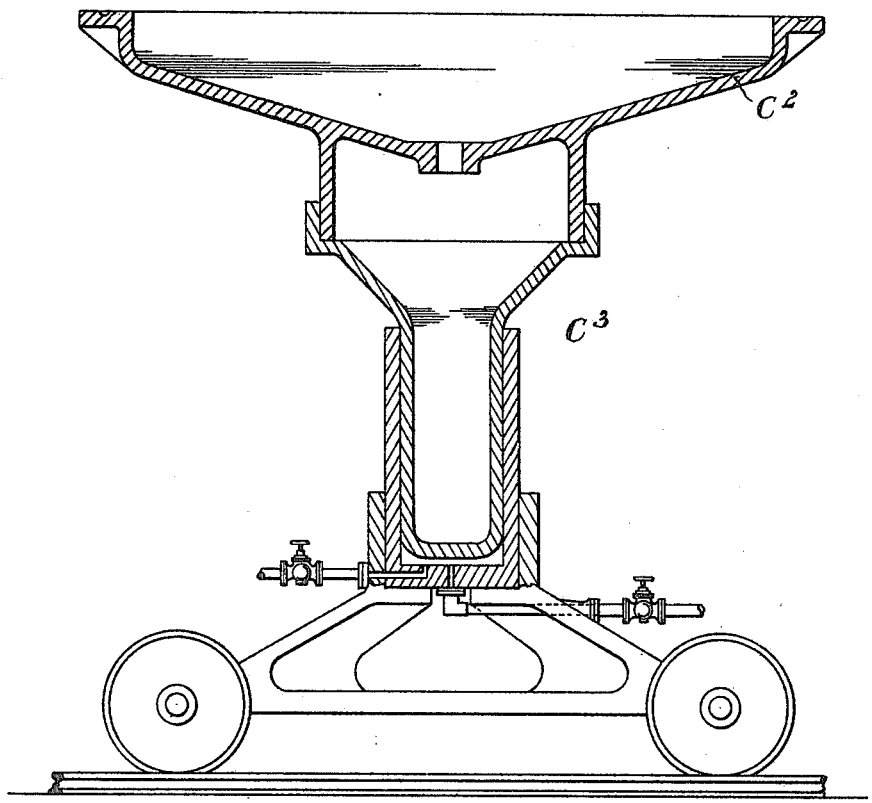

In the accompanying drawings, Fig. 1 is a vertical central section illustrating one construction of apparatus employed in carrying this invention into effect, Fig. 2 being an under side view of the bottom of the vessel illustrated in Fig. 1. Fig. 3 is an elevation, on a smaller scale, of the apparatus shown in Fig. 1 with a stirrer in the operative position. Fig. 4 is a vertical central section of an additional construction of apparatus according to this invention. Fig. 5 is a detail view of the stirrer-blades and shaft. Fig. 6 shows a tank-top provided with one device according to this invention for forcing downward a filter housed in the cavity of the top. Fig. 7 is a view in section, showing a surface filter with a slack and weighted fabric, such as is hereinbefore referred to. Fig. 8 is an under side view, partly in elevation and partly in section, of the surface filter shown in Fig. 7; and Fig. 9 shows an alternative construction of trolley for moving the filter-bottom, as hereinafter described.

Like letters indicate like parts throughout the drawings.

With reference, first, to Fig. 1, which illustrates a pressure-tank into which slime-bearing ore, pulverized and mixed with liquid, is delivered and there subjected to treatment for the abstraction of the liquid, C is the containing vessel supported on brackets $C'$ and which may be tapered so as to be of larger diameter at the bottom than at the top, and it is provided with a coned bottom $C^2$, which is suitably packed around its edges and removable from the bottom of the tank when the compacted charge J is to be expelled therefrom. The filter-bottom D is carried by the bottom $C^2$, so that when the latter is lowered and run out from beneath the tank C upon the screw-jack (see Fig. 1) or piston-actuated trolley $C^3$, (see Fig. 9,) provided for that purpose, the filter D is carried with it and the residual compacted mass in the tank C is supported by the bars $C^6$, which extend across the bottom of the tank, as shown in Fig. 2, and are each held in position at one end by a hinge $c$ and at the opposite end by a hinged hook $c'$. By knocking aside the hook under one end of any bar such bar drops, and the portion of the charge previously upheld by this bar then descends and is received in a trolley or other receptacle run in beneath the tank. By suitably operating these bars $C^6$ the compacted mass J can be discharged more or less gradually from the tank C instead of dropping out as one mass, or the residual mass can be removed by other means. The supporting-bars $C^6$ are, however, a general feature in each and every apparatus where the discharge of the treated material is by way of the bottom of the tank, although a perforated hinged bottom might be substituted therefor.

The space F below the filter-bottom forms a vacuum-chamber and at its lowest portion is provided with a drain-cock $C^5$ and a little above that level with an air-exhaust pipe G, which at its outer end has a cock $G'$ and an "air-brake" coupling or other means by which it may be readily put into connection with a vacuum-main leading to an air-pump or other apparatus by which a vacuum may be produced and maintained in the space F. The positions of these pipes and outlets may of course be altered without interfering with the principles involved. In general practice the pipe G is carried to an auxiliary vacuum-chamber, in which water passing through the said pipe is collected.

In the drawings, H is a layer of thick sediment on the filter-bottom, a larger body of solid residue J being above it, and the expressed liquid K being shown above the latter.

L is a surface filter through which the expressed liquid K passes to the shorter leg $M'$ of a pipe M, the longer leg $M^2$ discharging the liquid to any place desired and both filter and pipe being readily removable. The leg $M^2$ may also in certain cases be connected to a vacuum-chamber or exhaust-pump when liquid discharge by suction is desired. The construction of this filter will be hereinafter particularly described. Or the apparatus may be arranged as in Fig. 4, in which the tank C is mounted on wheels to run on track-rails $A^2$, between which is a vacuum-chamber F, over which a succession of tanks, such as C, can be run for treatment. The filter D, which in previous examples forms the bottom of the tank C, forms in this construction the top of the vessel F, and bars $C^6$, such as are shown in Figs. 2 and 3, are provided at the bottom of the tank C for the purpose of regulating the discharge of the pulp, as hereinbefore explained.

The bottom of the tank C and the top of the vessel F are made to fit closely upon each other and are provided with suitable packing to insure a tight joint between them.

To enable the tank C, Fig. 4, to be readily lifted clear of the top of the chamber F, so as to be run away from it along the rails $A^2$, it is provided with suitable raising and lowering devices, such as four lugs $C^7$, each of which retains a screw-threaded rod $C^8$, as shown. It is to be understood that in this construction the screw-threaded portion of each rod does not engage with the lug through which it passes, but serves to receive a nut $C^9$, situated on the rod below the lug. The lower part of each rod is formed as a fork to retain a wheel $C^{10}$, flanged to engage with and run upon the rails $A^2$. By operating the nut $C^9$ the lugs $C^7$, and with them the tank C can be readily forced up or lowered down. When it is slightly lifted from the top end of the chamber F, it can be readily carried away along the track, or it may be run back again and lowered into place at any future time with equal facility. This construction of apparatus (illustrated in Figs. 2, 3, and 4) is equally suitable when treating material either by gaseous pressure delivered into the tank C or by a vacuum set up in the chamber F or simultaneously by pressure in the tank C and vacuum in the chamber F. The chamber F in addition to serving as a vacuum-chamber serves as a receptacle for any liquid descending into it through the filter D.

In Fig. 5 is illustrated a stirring apparatus, which comprises a square shaft O, carrying at its lower ends vanes $O'$. The upper end of the shaft O is journaled in a swivel P, in which it can be rotated freely by means of the bevel-wheel Q, which is made to revolve on a fixed bearing R by the driving-shaft S and pinion $S'$. The central hole in the bevel-wheel Q, through which the shaft O passes, is made rectangular to fit the square-section shaft O, so that the latter, though compelled always to rotate in company with the bevel-wheel Q, may be freely moved endwise therethrough in order that the vanes or stirrers $O'$ may be lowered to the desired extent into and readily withdrawn from the vessel below it—as, for instance, by a wire rope T, passing over pulleys U, the pulleys U being supported upon stationary supports. The stirrer-shaft O is shown carried in a frame V, which is rotatable, so that the stirrer can be brought in turn over any one of a series of separating-tanks, which can be arranged in a circle at the same distance therefrom as the radial distance of the shaft O. In this construction the shaft S, supported in bearings $V'$ in the frame V, carries at its inner end a gear-wheel $S^2$, which meshes with a gear-wheel W, which, with the gear-wheel $W'$, is rotatable about the central pillar $V^2$ of the apparatus and driven by the wheel $W^3$, which latter is rotated by any convenient means. The hoisting-rope T for raising and lowering the stirrer is carried over pulleys U to a winch $V^3$, secured on the frame V in proximity to the stirrer-shaft, so that the attendant by whom the raising and lowering of the stirrer is to be controlled can, while standing at the winch-handle, look into the vessel over which the stirrer at any time is situated; or a stirrer capable of being raised and lowered can be arranged to travel along a railway to act in succession on a series of tanks placed alongside each other.

Fig. 6 shows an example of a top for the pressure-tank, so shaped that the filter L can be drawn up into it and protected by it from any risk of damage which might otherwise occur when the cover is removed in the manner presently to be described. The cover $C^{12}$ is provided with lugs $C^7$, screw-rods $C^8$, nuts $C^9$, and wheels $C^{10}$, by which it may be raised and lowered and moved from over the tank C on track-rails $A^2$ in a manner similar to that described with reference to the raising and lowering and removal of the tank C, Fig. 4. The surface-filter tube $M'$ is carried through a stuffing-box $C^{11}$ in the top of the cover and provided with rack-and-pinion mechanism or other gear by which it can be moved to hold the filter at any desired level within the tank C.

For the purpose of avoiding the adherence of slimes to the filtering fabric of the surface filter and to accomplish the ready removal of such slimes in case they have a tendency to choke the fabric we prefer to provide the filter-case with a filter-cover having a certain amount of slack and to attach a suitable weight to the filtering fabric, such as a circlet of lead. A filter thus fitted operates as follows: While the filter is in operation the fluid-pressure in the tank holds the filtering fabric against a support, such as a well-braced and suitably-covered wire screen. When the filtering action becomes slow or sluggish on account of the formation of a slime layer which has deposited on the fabric, the pressure is let off the tank and the lead or other weight attached to the filter fabric drops as far as the slack of the fabric allows, thus causing a movement of the fabric sufficient to cause the accumulated slime layer to drop off and leave the fabric clean in condition for further operation.

In the surface filter shown separately in Figs. 1, 7, and 8 the under side thereof is covered with a slack layer $L^2$ of filtering fabric weighted by a heavy ring $L^5$, this slack and weighted fabric being provided in order to enable slimes accumulated thereon to be shaken from it by causing the fabric to pulsate or flap. Above the fabric a layer or screen $L^6$ of wire-gauze or the like is provided, backed with radial ribs $L^7$. The spaces between the ribs form channels which direct fluid drawn through the gauze toward the exit from the filter afforded by the lower end of the pipe $M'$. The ribs $L^7$ of the filter may be so shaped that the layer $L^6$ of gauze is slightly coned, as shown. The lowest portion of the apex of the gauze $L^6$ should not be at any higher level than that of the lowest part of the circumference of the filter, so that when this form of filter settles upon the residue J of compacted material below it no such stoppage of the withdrawal of surface liquid such as would occur if the filter were flat-bottomed will take place, for only the center of the filter will touch the compacted material beneath it, thus leaving a circumferential clearance-space past the circumference of the apparatus until practically the whole of the surface liquid is extracted by way of the delivery-pipe $M'$ of the filter, which is led to the lowest point of the interior above the gauze in order that the mouth of the pipe may remain immersed to the last.

The operation when slime-bearing ore is being treated which has been pulverized in the wet way, such as by stamps, and which contains precious metals to be dissolved and also concentratable base-metal-bearing compounds is preferably as follows: The mixed ore-pulp and water are delivered into a pressure-tank C until the same is filled to within about a foot of the top. While the filling is proceeding the contents are kept in rotatory motion by means of the stirrer O and blades $O'$, which have been previously lowered to a point about eight inches above the filter-bottom D. When the full charge is contained, the stirrer is withdrawn half-way while under motion. Its rotation is then stopped and it is raised out of the tank and removed out of the way. The top or cover $C^{12}$ is then put in position and fastened down pressure-tight. The filter or float L contained in the cover-housing is then lowered and released from its raising-tackle, so that it can act freely in a downward direction. Air-pressure of about fifty pounds per square inch is now applied to the tank by means of air-delivery pipe $c^{14}$, and the pipe $C^5$ of the filter-bottom chamber F is connected with a vacuum chamber or vessel. A portion of the water will be forced through the filter-bottom D and carried away by vacuum-pipe $C^5$, while the greater portion will collect on top of the ore while compacting is proceeding, and this progress is determined by test-cocks $c^{13}$, which are spaced down to as low a point in the tank as the solids can occupy after compacting. When the lower test-cocks deliver water instead of mud when opened, the water on top of the ore may be withdrawn, which is done by opening valve $M^3$ of pipe M, connected to the internal float or filter L. The air-pressure within the tank then forces the water through the filter and pipe M, and this water is sufficiently clear for reuse in ore treatment; but if it is desired to have it in a clarified state it is passed through auxiliary filter $W^4$. This auxiliary filter consists of a tank or receptacle above the lower end of which is arranged a removable filter-cloth $W^5$, on which is a layer of sand $W^6$. Below the filter-cloth $W^5$ is an outlet $W^7$. If the charge has been properly agitated, the slimes will all be found collected on top of the compacted charge, and this layer will crack open as soon as the water is removed from its surface, a fact which is indicated when pipe M of filter L delivers air in place of water. The vacuum is now broken, the filter-bottom discharge $C^5$ is connected with the auxiliary filter $W^4$, the air-inlet $c^{14}$ is closed, and the air-supply is connected with pipe M, so as to force the air to pass through the filter fabric $L^2$ before entering the tank. The filter is also raised into the cover, and the air which now enters passes through the crevices of the cracked slime and out through the filter-bottom. If the charge is cracked badly or insufficiently, pressure is let off the tank and the air-supply is connected with the chamber below the filter-bottom and the air is allowed to pass up through the charge for a few minutes, when the charge will be found well opened, and the air is switched above the charge again and allowed to pass through the charge until the latter has been freed of as much moisture-water as is desired. If it is desired to give an alkaline wash to the ore, it may now be best applied by pumping it up through the filter-bottom until it just reaches the top of the slime, allowing it to remain a short time and then driving it out with the pressure from above and drying the charge again. The top of the tank and the filter-bottom are now removed, and the dried compacted ore-pulp is held suspended in the tank by bars $C^6$, while the concentrates are collected on and are removed with the filter-bottom. These concentrates are thus not only removed for their valuable contents, but also in order to remove from the ore chemical-solution-destroying ingredients, such as soluble sulfates, an example of which is sulfate of iron. The compacted and purified ore is now removed from the apparatus by dropping the supporting-bars $C^6$, and it may be at once dropped into suitable tram-cars or other conveyers. We prefer to remove the ore to suitable barrel-agitators and to mix it with a solvent solution therein and to cause its solution by gentle agitation. When the metals to be abstracted have thus been dissolved, the mixed ore and solution is placed into a pressure-separator again and is there subjected to the same treatment for the recovery of the metal-bearing solution and final washing as it has previously undergone for the removal of the water and application of alkaline wash. The metals are recovered from the solution in the usual manner.

It will be readily understood that the apparatus herein described is applicable also for causing percolation by pressure through ores of a permeable character, in which case of course the surface filter is dispensed with, and we desire it to be understood that we claim the use of the apparatus as described and shown for percolation as fully within the scope of our invention.

We claim—

1. The method of abstracting liquid from finely-pulverized ore, ore-slimes or other solids impervious to percolation with which the liquid is mixed, which consists in subjecting the mixture to gaseous pressure, removing a portion of the liquid by filtration below the body during compaction of the solids, and abstracting by pressure the remaining liquid above the compacted solids, substantially as described.

2. The method of abstracting liquid from finely-pulverized ore, ore-slimes or other solids impervious to percolation with which the liquid is mixed, which consists in subjecting the mixture to gaseous pressure applied above the same, and simultaneously to the action of a partial vacuum applied below the same, removing a portion of the liquid by filtration below the body during compaction of the solids, and collecting and abstracting by pressure the remaining liquid above the compacted solids, substantially as described.

3. The method of abstracting liquid from finely-divided ore or other solids mixed therewith and simultaneously separating the concentratable metal-bearing compounds from the ore, which consists in agitating the charge, subjecting the same after agitation to pressure, removing the liquid, and finally removing the concentrates, substantially as described.

4. The method of removing finely-divided ore or other solids from liquid mixed therewith, which consists in subjecting the mixture to gaseous pressure, compacting the solids, removing while under pressure a portion of the liquid on top of the compacted solids by filtration, and finally subjecting the liquid to further filtration, substantially as described.

5. In an apparatus for the separation of the solid and liquid constituents of slime-bearing materials and the like, the combination of a receptacle having a filter-bottom, means for agitating the mixture, and means for abstracting the liquid from the top thereof, substantially as described.

6. In an apparatus for the separation of the solid and liquid constituents of slime-bearing materials and the like, the combination of a receptacle having a filter-bottom, an internal filter above the bottom, and a removable top adapted to house and carry the internal filter, substantially as described.

7. In an apparatus for the separation of the solid and liquid constituents of slime-bearing material and the like, the combination of a receptacle having a filter-bottom, and a removable top, an outlet or discharge pipe movable in a closely-fitting opening in said top, liquid-abstracting means carried by said pipe, and mechanism for raising and lowering the pipe and means, substantially as described.

8. In an apparatus for the separation of the solid and liquid constituents of slime-bearing materials and the like, a receptacle having a removable filter-bottom, and a series of movable supporting-bars above said bottom, substantially as described.

9. In an apparatus for the separation of the solid and liquid constituents of slime-bearing materials and the like, a cased filter having a delivery-pipe opening into the lower part of the case, and a slack and weighted filtering fabric below said pipe-opening, substantially as described.

10. In an apparatus for the separation of the solid and liquid constituents of slime-bearing material and the like, the combination of a tank open at the top and bottom, a removable cover for the top, a removable closure for the bottom, and means connected with the bottom for raising and lowering the same and for moving it laterally, substantially as described.

In witness whereof we have hereto set our hands in the presence of the two subscribing witnesses.

W. A. KÖNEMAN.
W. H. HARTLEY.

Witnesses:
ANNIE M. VIALL,
CHAS. ROSE.